United States Patent [19]

Mitsuda et al.

[11] 4,152,504

[45] May 1, 1979

[54] PROCESS FOR PRODUCING CONJUGATED DIENE POLYMERS

[75] Inventors: Yutaka Mitsuda; Yoshihisa Moriya; Hideyuki Tanaka; Shinji Sato, all of Machida, Japan

[73] Assignee: Denki Kagaku Kogyo Kabushiki Kaisha, Tokyo, Japan

[21] Appl. No.: 788,949

[22] Filed: Apr. 19, 1977

[30] Foreign Application Priority Data

Apr. 19, 1976 [JP] Japan .................. 51/43614

[51] Int. Cl.$^2$ ........................... C08F 4/46; C08F 4/56
[52] U.S. Cl. ................................ 526/175; 526/182
[58] Field of Search ....................... 526/175, 182

[56] References Cited

U.S. PATENT DOCUMENTS

| | | | |
|---|---|---|---|
| 3,423,379 | 1/1969 | Grinninger et al. | 52/175 |
| 3,448,093 | 6/1969 | Grinninger et al. | 526/182 |
| 3,607,851 | 9/1971 | Forman | 526/175 |
| 3,726,832 | 4/1973 | Komatsu et al. | 526/175 |
| 3,897,406 | 7/1975 | Halasa et al. | 526/175 |
| 4,097,661 | 6/1978 | Komatsu et al. | 526/175 |

*Primary Examiner*—William F. Hamrock
*Attorney, Agent, or Firm*—Sughrue, Rothwell, Mion, Zinn and Macpeak

[57] ABSTRACT

A process for producing a conjugated diene polymer, which comprises polymerizing (a) a conjugated diene, (b) two or more conjugated dienes or (c) at least one conjugated diene with a monovinyl aromatic compound, at a temperature of from about 30 to about 100° C in an inert hydrocarbon solvent in the presence of a catalyst composition comprising (i) an alkenyl sodium containing 3 to 8 carbon atoms in the alkenyl moiety and (ii) a sodium alkoxide of a dimethylalkyl carbinol containing 1 to 5 carbon atoms in the alkyl moiety.

15 Claims, No Drawings

PROCESS FOR PRODUCING CONJUGATED DIENE POLYMERS

BACKGROUND OF THE INVENTION

1. Field of the Invention

This invention relates to a process for producing an elastomeric polymer derived mainly from a conjugated diene. More specifically, it relates to a process for producing a conjugated diene polymer which comprises polymerizing a conjugated diene, or copolymerizing a conjugated diene with another conjugated diene or a monovinyl aromatic compound, at a temperature in the range of about 30 to about 100° C. in the presence of a catalyst composed of an alkenyl sodium and a sodium alkoxide of a dimethylalkyl carbinol.

2. Description of the Prior Art

Polymerization of a conjugated diene, or copolymerization of a conjugated diene with another conjugated diene or a monovinyl aromatic compound, which is catalyzed with an alkali metal or alkali metal compound as a catalyst, is widely known.

Alfin catalysts and a metallic sodium catalyst have heretofore been used as catalysts containing an organic sodium compound or metallic sodium in the polymerization of conjugated dienes with or without monovinyl aromatic compounds.

It is well known that the alfin-catalyzed polymerization of conjugated dienes with or without monovinyl aromatic compounds results in a rapid rate of polymerization, provides polymers having a wide molecular weight distribution in high yields, and results in a trans-block of butadiene, and that rubbers obtained by vulcanizing the resulting polymers have superior properties such as high abrasion resistance, tensile strength and flex resistance. The production of alfin rubbers using alfin catalysts is described extensively in the literature including Morton, *Rubber Age*, Vol. 94, pages 87 to 92, October 1963.

Polymers obtained by polymerizing conjugated dienes with or without monovinyl aromatic compounds using alfin catalysts are too hard for use as a rubber and have many undesirable properties because they have extremely high molecular weights with a wide distribution of molecular weight and result in a trans-block of butadiene, i.e., a block of butadiene units bonded with trans linkages.

A polymerization catalyzed with metallic sodium, on the other hand, has the disadvantage that the proportion of 1,2-bonds of butadiene is increased and a high polymer is very difficult to produce.

A polymerization of conjugated dienes with or without monovinyl aromatic compounds which is catalyzed with an organolithium industrially results in the production of random copolymers and block copolymers.

It is known as described in Japanese Patent Application (OPI) No. 68686/73, for example, that organopotassium compounds can be used to catalyze the polymerization of conjugated dienes, but not on an industrial scale.

The present invention pertains to a catalyst composition comprising an alkenyl sodium and a sodium alkoxide of a dimethylalkyl carbinol which on superficial examination might be considered similar in composition to alfin catalysts, but in fact is not similar and results in the production of polymers which are quite different from those produced using conventional alfin catalysts.

Morton in *J. Am. Chem. Soc.*, Vol. 69, p.959 (1947), discloses that a catalyst composition composed of an alkenyl sodium and sodium tert.-butoxide does not exhibit the characteristics of an alfin catalyst in polymerization at room temperature, and as a result, concluded such was outside the definition of alfin catalysts.

Furthermore, Morton in *Advances in Catalysis*, Vol. 9, p.746 (1957), disclosed that when sodium tert.-butoxide was used instead of sodium isopropoxide in a typical alfin catalyst, the yield of polymer drastically decreased from 75% to only 7%, and there was a marked decrease in molecular weight, thus demonstrating the characteristics of such a catalyst composition as an alfin catalyst did not exist.

Relatively recently, R. Lenz disclosed in *Organic Chemistry of Synthetic High Polymers*, p. 637, (1967), that alcohols other than secondary alcohols do not give rise to any appreciable alfin catalyst activity.

Thus, from these disclosures in the prior art combinations of an alkenyl sodium and sodium tert.-butoxide have heretofore been excluded by those skilled in the art from inclusion within the definition of alfin catalysts.

SUMMARY OF THE INVENTION

A primary object of this invention is to provide high-molecular-weight polymers in high yields by polymerizing conjugated dienes with or without monovinyl aromatic compounds in accordance with an improved polymerization method using a catalyst composition comprising an alkenyl sodium and a sodium alkoxide of a dimethylalkyl carbinol for which characteristics similar to those obtained in use of an alfin catalyst have not been obtainable in the prior art.

A second object of the invention is to increase the random-copolymerizability of conjugated dienes with monovinyl aromatic compounds to narrow the molecular weight distribution of the resulting polymers and to reduce the trans-block of butadiene using an improved polymerizing method.

A third object of this invention is to improve the processing characteristics and other properties of the resulting polymers as a rubber.

The above objects are achieved in the present invention which provides a new organosodium-catalyzed polymerization method which differs from alfin polymerization, and thus, gives rise to the ability to produce new and industrially useful elastomeric polymers which are quite different from the conventional elastomeric polymers obtained in a polymerization using lithium-type or alfin-type catalysts (i.e., alkali metal-based catalysts) and from the elastomers obtained using emulsion polymerization.

This invention provides a process for producing a conjugated diene polymer, which comprises polymerizing (a) a conjugated diene, (b) two or more conjugated dienes or (c) at least one conjugated diene with a monovinyl aromatic compound, at a temperature of from about 30° to about 100° C. in an inert hydrocarbon solvent in the presence of a catalyst composition comprising (i) an alkenyl sodium containing 3 to 8 carbon atoms in the alkenyl moiety and (ii) a sodium alkoxide of a dimethylalkyl carbinol containing 1 to 5 carbon atoms in the alkyl moiety.

DETAILED DESCRIPTION OF THE INVENTION

According to the process of this invention, the catalyst composition comprising an alkenyl sodium and a sodium alkoxide of a dimethylalkyl carbinol exhibits a far higher activity than would be exhibited in the conventional polymerization methods, and provides new elastomeric diene polymers which have new characteristics different from those of polymers obtained with the conventional alfin catalysts.

The diene polymers obtained by the process of this invention have the following advantages.

1. The yield of polymer per unit amount of the catalyst is increased.
2. The molecular weight distribution of the polymer becomes extremely narrow.
3. The trans-block of butadiene in the polymer is markedly reduced.
4. A random copolymer can be obtained by copolymerizing a conjugated diene with a monovinyl aromatic compound.
5. The processing characteristics and other properties of the polymer as a rubber are improved.

The catalyst composition used in this invention as described above comprises an alkenyl sodium and a sodium alkoxide of a dimethylalkyl carbinol having the formula

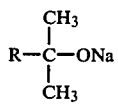

where R is an alkyl moiety having 1 to 5 carbon atoms therein. The composition of this catalyst disclosed in *Advances in Catalysis*, Vol. 9, p. 746, (1957). Sodium halide may be present in the catalyst depending upon the method of preparation of the alkenyl sodium.

The method disclosed in Morton *Rubber Age, supra*, and the method disclosed in Japanese Patent Application Nos. 155972/75 and 151300/75 can be employed to prepare the catalyst used in this invention. The preparation of the catalyst used in this invention, however, is not to be construed as being limited to these methods.

The method of Morton, *Rubber Age, supra*, comprises reacting metallic sodium with a halogenated hydrocarbon, reacting the resulting product with a dimethylalkyl carbinol, and then reacting the product with a monoolefin.

The method disclosed in Japanese Patent Application No. 155972/75 involves mixing an alkenyl sodium with a separately prepared sodium alkoxide of a dimethylalkyl carbinol to form a catalyst.

The dimethylalkyl carbinol used to prepare the sodium alkoxide in the present invention preferably has 1 to 5 carbon atoms in the alkyl moiety. Higher carbinols could be used, but result in a reduction in catalytic activity and no special benefit is achieved with their use.

Examples of suitable dimethylalkyl carbinols which can be used in the invention are tert.-butyl alcohol, tert.-pentyl alcohol, 2-methyl-2-pentanol, and 2,3-dimethyl-2-butanol. Tert.-butyl alcohol is most preferred.

In the present invention, a secondary alcohol and/or a primary alcohol may be used together with the dimethylalkyl carbinol. Suitable secondary alcohols may be those described in Japanese Patent Publication No. 3371/67 (corresponding to U.S. Pat. No. 3,317,431). Preferred primary alcohols are, for example, ethanol and 1-propanol.

Examples of monoolefins which can be suitably used in catalyst preparation in this invention may contain 3 to 8 carbon atoms. Specific examples of suitable monoolefins are propylene, 1-butene, 2-butene, and 1-pentene. Propylene is most preferred.

The molar ratio between the alkenyl sodium and the sodium alkoxide can be varied as desired depending on the conditions of catalyst preparation. Preferably, the molar ratio is such that 0.2 to 4 moles, more preferably 1 to 3 moles, of the sodium alkoxide is present per mole of the alkenyl sodium.

The amount of the catalyst used in the polymerization or copolymerization process of this invention is not particularly limited. Generally, 0.1 to 200 mllimoles, preferably 0.5 to 50 millimoles, of the alkenyl sodium is used per 100 g of monomer. If the amount of the alkenyl sodium is less than 0.1 millimole, the yield of the polymer is poor, and amounts larger than 200 millimoles tend to cause a faster rate of polymerization, which may make it difficult to remove the catalyst in a post-treatment step, and degrade the properties of the final polymer.

The method of this invention can be carried out in inert polymerization solvents. Suitable examples of inert polymerization solvents which can be used include aliphatic saturated hydrocarbons such as n-hexane, n-pentane, heptanes or iso-octane, alicyclic hydrocarbons such as cyclohexane or methylcyclohexane, and aromatic hydrocarbons such as benzene, toluene, xylene or tetralin. A suitable monomer concentration in the inert polymerization solvent can range from about 1 to about 50% by weight, preferably about 5 to about 20% by weight.

The polymerization temperature used in the invention can range from about 30° C. to about 100° C., preferably from 40° C. to 70° C. If the polymerization temperature is below about 30° C., the catalytic activity of the catalyst composition is extremely low, and the yield of the polymer is drastically reduced. Consequently, the products are polymers having no practical value such as those heretofore described in the literature. Polymerization temperatures higher than about 100° C. result in low yields and only low-molecular-weight polymers are obtained. Thus, at temperatures outside the range of about 30° to about 100° C., commercially feasible elastomers cannot be obtained.

When a polymerization catalyzed with conventional alfin catalysts is performed in the absence of molecular weight controlling agents, the molecular weight distribution of the resulting polymer is very broad, and elastomers which can be practically used cannot be obtained. In contrast, according to the process of this invention, the molecular weight of the polymer produced can be controlled without a molecular weight controlling agent by using a catalyst composed of an alkenyl sodium and a sodium alkoxide of a dimethylalkyl carbinol and setting the polymerization temperature to about 30° to about 100° C., and elastomers having a narrow molecular weight distribution can be obtained. Thus, the ability to conduct the polymerization in the absence of molecular weight controlling agents, which tend to deactivate the catalyst, provides the advantage that the amount of the catalyst used in the polymerization can be greatly decreased. Although molecular weight controlling agents need not be used to achieve the results desired, generally, however, the effects of the present invention can be ever further enhanced by using molecular weight controlling agents.

Specifically, in polymerizing monomers in this invention, if it is disired to use a molecular weight controlling agent, those known to be suitable for use in alfin-catalyzed polymerizations can be used. Specific examples of suitable molecular weight controlling agents include dihydro aromatic compounds (such as 1,4-dihydronaphthalene, e.g., as disclosed in U.S. Pat. No. 3,067,187), polyethers (such as ethylene glycol dimethyl ether, e.g., as disclosed in U.S. Pat. No. 2,841,574), cyclic ethers (such as dioxane, e.g., as disclosed in U.S. Pat. No. 2,841,574), 1,4-pentadiene (U.S. Pat. No. 3,518,238), halogenated olefins (such as vinyl chloride, e.g., as disclosed in U.S. Pat. No. 3,836,513), allene (Japanese Patent Application (OPI) No. 35079/72), vinyl ether (such as vinyl methyl ether, e.g., as disclosed in U.S. Pat. No. 3,726,832), halogenated aromatics (such as chlorobenzene, e.g., as disclosed in U.S. Pat. No. 3,448,093), amine compounds (such as pyridine, e.g., as disclosed in U.S. Pat. No. 2,841,574), furan, thiophene, mercaptanes (e.g., as disclosed in U.S. Pat. No. 3,341,931), esters, aldehydes, and ketones. These agents can be used either individually or in combination. A suitable amount of the molecular weight controlling agent can range from about 0.1 to about 10 g per 100 g of the monomer.

Of these, halogenated aromatics are most preferred because they can be effectively employed in lower amounts than other molecular weight controlling agents, and their use gives rise to the production of a narrower molecular weight distribution than does the use of other types of molecular weight controlling agents. Preferred halogenated aromatics are those containing chlorine and bromine atoms. Aromatic hydrocarbons substituted with one or more of these halogen atoms can be used. Specific examples of suitable halogenated aromatic hydrocarbons include chlorobenzene, (o-, m-, p-)dichlorobenzene, 1,2,3-trichlorobenzene, 1,2,4-trichlorobenzene, 1,3,5-trichlorobenzene, tetrachlorobenzenes, pentachlorobenzene, hexachlorobenzene, chlorotoluene, chloroxylene, 1-chloronaphthalene, 2-chloronaphthalene, chlorodiphenyl, 1-chloroanthracene, 2-chloroantharacene, dichloronaphathalenes, trichloronaphthalenes, dichloroanthracenes, trichloroanthracenes, dichlorodiphenyls, trichlorodiphenyls, bromobenzene, dibromobenzenes, tribromobenzenes, bromotoluene, bromoxylene, bromonaphthalenes, bromodiphenyls, bromoanthracenes, dibromoanthracenes, and chlorophenanthrenes.

The amount of the halogenated aromatics preferably used in this invention is usually about 0.01 to about 10 g, preferably 0.1 to 5.0 g, per 100 g of monomer. The above described halogenated aromatics may be used either individually or in combination.

Usually, the molecular weight controlling agent is added to the polymerization system before the introduction of the catalyst. However, if desired, it may be added during the polymerization.

The monomer used in this invention can be a single kind of conjugated diene or a monomeric mixture of two or more kinds of conjugated dienes, or a monomeric mixture of a conjugated diene and a monovinyl aromatic hydrocarbon. Examples of suitable conjugated dienes which can be used are 1,3-butadiene, isoprene, piperylene, and 2,3-dimethyl butadiene. Examples of suitable monovinyl aromatic hydrocarbons are styrene, α-methylstyrene, β-methylstyrene, 3-vinyltoluene, 1-vinylnaphthalene, 2-vinylnaphthalene, p-methoxystyrene, and p-chlorostyrene. Generally, the amount of the monovinyl aromatic hydrocarbon to be copolymerized is preferably 0 to 80% by weight of the copolymer.

Generally, the polymerization is carried out in an inert solvent under a pressure of not more than about 30 atmospheres and either a batchwise method, a semi-continuous method or continuous method can be used.

The atmosphere of the polymerization system is purged with an inert gas such as nitrogen, argon or helium. It is necessary to remove substances which will deactivate the catalyst, such as water, alcohol or oxygen, prior to polymerization.

It has been found that an additional advantage can be achieved by performing the polymerization of this invention in the presence of a polyvinyl aromatic compound. A polymer obtained by polymerization in the absence of the polyvinyl aromatic compound, when compounded with carbon black, has a high viscosity (usually called Mooney viscosity of unvulcanized elastomer), and a pehnomenon called "bagging" occurs on compounding rolls during or after compounding the polymer with carbon black, thus causing the elastomer or compound to separate from the surface of rubber rolls and not closely adhereing to the roll surface. In contrast, a polymer obtained by polymerization in accordance with the process of this invention in the presence of a polyvinyl aromatic compound has very good processing characteristics because a low Mooney viscosity is obtained, little risk of scorching is involved, and a little tendency toward bagging results. The properties of vulcanizates of the resulting polymer so produced are further improved.

Suitable polyvinyl aromatic compounds which can be used are expressed by the general formula

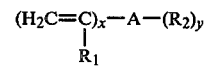

wherein A represents an unsubstituted or substituted aromatic ring, such as a benzene, naphthalene, durene or biphenyl ring; $R_1$ and $R_2$ each represents a hydrogen atom or an unsubstituted or substituted aliphatic group containing 1 to 20 carbon atoms; x represents an integer of at least 2 and up to the maximum number (n) of

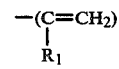

groups that can be substituted on the aromatic ring A; and y is an integer of from 0 to (n-2) and represents the number of the substituents $R_2$. $R_1$ and $R_2$ are each most preferably a methyl group.

Specific examples of suitable polyvinyl aromatic compounds are divinylbenzene, trivinylbenzene, tetravinylbenzene, divinyltoluene, trivinyltoluene, divinylxylene, trivinylxylene, tetravinylxylene, divinylnaphthalene, trivinylnaphthalene, divinylbiphenyl, and trivinylbiphenyl. These polyvinyl aromatic compounds can be used either individually or as an admixture of two or more.

The amount of the polyvinyl aromatic compound added is preferably about 0.001 to about 0.5 part by weight, especially preferably 0.01 to 0.1 part by weight, per 100 parts by weight of the total monomer weights. Amounts of less than about 0.001 part by weight do not produce sufficient effects in improving the processing characteristics of the resulting polymer. On the other hand, when the amount is too large, the resulting polymer gellation occurs. Amounts up to about 0.5 part by weight are most preferred, and if the amount exceeds about 0.5 part by weight, it is difficult to prevent gellation.

The polyvinyl aromatic compound is usually added at the initiation of the polymerization, but it may be added during the polymerization when the conversion has reached a certain desired value.

The polymerization is usually carried out by charging a polymerization vessel with monomers, an inert organic solvent, and a molecular weight controlling agent, further adding a polyvinyl aromatic compound thereto, and contacting the monomers with the catalyst suspended in the system. However, as stated hereinabove, the polyvinyl aromatic compound may be added during the polymerization. A suitable reaction atmosphere for the polymerization is any inert atmosphere (such as an atmosphere of nitrogen or a noble gas such as argon). The pressure of the reaction system will vary depending on the reaction conditions but can range up to about 10 atms. The reaction is generally completed within about 10 hours.

The following examples are given to illustrate the present invention more specifically. Unless otherwise indicated, all parts and percentages in these examples are by weight.

The catalyst used in these examples was prepared in the following manner.

An autoclave was charged with 80 g of dry cyclohexane, and 37 g of a sodium dispersion containing 11.5 g (0.50 mole) of metallic sodium having a particle diameter of about 10μ was added. Then, 37.1 g (0.50 mole) of tert.-butanol was added dropwise at 100° C. over the course of about 2 hours. After the addition, the reaction was carried out at 120° C. for 30 minutes. Then, another autoclave was charged with 148 g of dry cyclohexane, and 62.0 g of a metallic sodium dispersion containing 11.5 g (0.50 mole) of metallic sodium having a particle diameter of about 10μ was added. While the temperature of the inside of the autoclave was maintained at 40° C., 23.1 g (0.250 mole) of n-butyl chloride was added dropwise over the course of about 2 hours, thereby to form n-butyl sodium and sodium chloride. After allowing the system to stand for 30 minutes, 12.6 g (0.300 mole) of propylene was added, and the reaction was performed at 70° C. for 2 hours. To the reaction mixture was added the previously prepared dispersion of sodium tert.-butoxide, and the system was thoroughly mixed. The mixture was heated at 70° C. for 2 hours, and then allowed to cool to room temperature (about 20° to 30° C.). The resulting catalyst was analyzed, and found to contain 0.56 millimole/g of allyl sodium and 1.25 millimoles/g of sodium tert.-butoxide.

EXAMPLE 1

An autoclave equipped with a stirrer, a thermometer and external heating and cooling means was charged with 900 g of dried cyclohexane, 90 g of butadiene, 10 g of styrene and 1.0 g of trichlorobenzene as a molecular weight controlling agent under a nitrogen gas atmosphere. Then, the catalyst was added, and the butadiene and styrene were copolymerized at 40° C. for 60 minutes. The final conversion was 95%. The polymerization reaction mixture was poured into water to stop the polymerization. The, 0.1 g of N-phenyl-β-naphthylamine was added, and the mixture was dried under reduced pressure.

The microstructure of the resulting polymer was examined using infrared spectroscopy, the molecular weight distribution curve of the resulting polymer was examined using gel-permeation chromatography, and the presence or absence of a trans-block of butadiene in the polymer was determined using a differential scanning calorimeter (DSC). The results obtained are shown in Table 1 below. It was found that the polymer had a moderately high molecular weight, a narrow molecular weight distribution, and some trans-block of butadiene, and the yield of the polymer was high.

EXAMPLE 2

Polymerization was carried out in the same manner as in Example 1 except that the polymerization temperature was changed to 60° C. The results obtained are shown in Table 1. It was found that the yield of the polymer was high, the molecular weight distribution of the polymer was narrow, and trans-block of butadiene was absent in the polymer.

COMPARATIVE EXAMPLE 2

The procedure of Example 1 was repeated except that the polymerization temperature was changed to 20° C. The results obtained are shown in Table 1. It was found that the yield of the polymer was low, the molecular weight distribution of the polymer was broad, and trans-block of butadiene was observed in the polymer.

COMPARATIVE EXAMPLE 1

The procedure of Example 1 was repeated except that the polymerization temperature was changed to 120° C. The results obtained are shown in Table 1. It was found that the polymer had a low molecular weight and a broad molecular weight distribution, and the yield of the polymer was low.

EXAMPLE 3

The procedure of Example 1 was repeated except that 20 g of styrene and 80 g of butadiene were used as feed monomers, and the polymerization temperature was changed to 60° C. The results obtained are shown in Table 1. It was found that the polymer had a narrow molecular weight distribution and was free from trans-block, and the yield of the polymer was high.

EXAMPLE 4

The procedure of Example 1 was repeated except that 100 g of butadiene was used as a feed monomer, styrene was not used, and the polymerization temperature was changed to 60° C. The results obtained are shown in Table 1. It was found that the polymer had a narrow molecular weight distribution and was free from trans-block, and the yield of the polymer was high.

COMPARATIVE EXAMPLE 3

The procedure of Example 4 was repeated except that the polymerization temperature was changed to 20° C. The results obtained are shown in Table 1.

COMPARATIVE EXAMPLE 4

The procedure of Example 4 was repeated except that the polymerization temperature was changed to 120° C. The results obtained are shown in Table 1.

COMPARATIVE EXAMPLE 5

A monomeric mixture of 15 parts of styrene and 85 parts of butadiene was polymerized at 40° C. to a conversion of 90% using an alfin catalyst composed of allyl sodium, sodium isopropoxide and sodium chloride. The various characteristics of the resulting styrene/butadiene copolymer were measured, and the results obtained are shown in Table 1.

Table 1

| Example No. | Amount of Feed Monomers | | Amount of Catalyst (millimoles of allyl sodium) | Polymerization Temperature (°C.) | Polymer Yield (%) | Polymerization Time (min.) | Amount of Trichlorobenzene (g) | $[\eta]^{(1)}$ |
|---|---|---|---|---|---|---|---|---|
| | Butadiene (g) | Styrene (g) | | | | | | |
| Example 1 | 90 | 10 | 6.8 | 40 | 95 | 60 | 1.0 | 2.5 |
| Example 2 | 90 | 10 | 6.8 | 60 | 97 | 60 | 1.0 | 2.3 |
| Comparative Example 1 | 90 | 10 | 6.8 | 20 | 6 | 60 | 1.0 | 2.7 |
| Comparative Example 2 | 90 | 10 | 6.8 | 120 | 36 | 60 | 1.0 | 0.5 |
| Example 3 | 80 | 20 | 6.8 | 60 | 93 | 60 | 1.0 | 2.2 |
| Example 4 | 100 | 0 | 6.8 | 60 | 94 | 60 | 1.0 | 2.3 |
| Comparative Example 3 | 100 | 0 | 6.8 | 20 | 5 | 60 | 1.0 | 2.6 |
| Comparative Example 4 | 100 | 0 | 6.8 | 120 | 31 | 60 | 1.0 | 0.6 |
| Comparative Example 5 | 85 | 15 | — | — | — | — | — | 2.0 |

| Example No. | Microstructure of the Polymer$^{(2)}$ | | | | Molecular Weight Distribution (Mw/Mn)$^{(3)}$ | Trans-block$^{(4)}$ |
|---|---|---|---|---|---|---|
| | 1,4-Cis | 1,4-Trans | 1,2-Vinyl | Styrene | | |
| Example 1 | 0 | 61 | 39 | 9.8 | 3.8 | Slightly Present |
| Example 2 | 0 | 60 | 40 | 9.9 | 2.6 | Absent |
| Comparative Example 1 | 0 | 69 | 31 | 14.6 | 10.2 | Present |
| Comparative Example 2 | 0 | 28 | 72 | 16.2 | — | — |
| Example 3 | 0 | 61 | 39 | 19.9 | 2.5 | Absent |
| Example 4 | 0 | 61 | 39 | 0 | 2.7 | Absent |
| Comparative Example 3 | 0 | 70 | 30 | 0 | 12.1 | Present |
| Comparative Example 4 | 0 | 25 | 75 | 0 | — | — |
| Comparative Example 5 | 0 | 65 | 35 | 14.5 | 8.7 | Present |

Notes
$^{(1)}$The intrinsic viscosity $[\eta]$ was measured in toluene at 25° C. using an Ubbelohde viscometer.
$^{(2)}$The microstructure was measured using an infrared-spectrophotometer in accordance with the method of R.S.Silas, Anal. Chem. 31, 529 (1959).
$^{(3)}$The number average molecular weight (Mn) and the weight average molecular weight (Mw) were determined from the molecular weight distribution curve obtained using gel-permeation chromatography, and the molecular weight distribution index (Mw/Mn) wascalculated.
$^{(4)}$Evaluated by the presence or absence of a heat absorption peak of trans-block which would occur at a temperature of 30 to 50° C. in a differential scanning calorimeter (DSC).

EXAMPLE 6

The roll banding of the polymers obtained in Examples 1 and 2 were examined.

| Polymer | Roll Banding$^{(1)}$ | Flexibility |
|---|---|---|
| Polymer of Example 1 | Banded smoothly | Flexible |
| Polymer of Example 2 | Banded smoothly | Flexible |
| Polymer Obtained with an Alkyl Lithium Catalyst$^{(2)}$ | Not banded at all | Flexible |
| Polymer Obtained with an Alfin Catalyst$^{(3)}$ | Partly banded, but quite unstable | Hard |

Notes
$^{(1)}$A banding test was performed on 6' open rolls (rotation ratio: 1:1.1) at 60° C. with a roll clearance of 1.0 mm.
$^{(2)}$Solprene 1204, a trademark for a random copolymer of styrene and butadiene produced by Asahi Chemical Co., Ltd.
$^{(3)}$Alfin Rubber AL-3500, a trademark for a random copolymer of styrene and butadine produced by Nippon Alfin Rubber Co., Ltd.

EXAMPLE 7 and COMPARATIVE EXAMPLE 6

An autoclave equipped with a stirrer, a thermometer, and external heating and cooling means was charged with 900 parts of dried cyclohexane, 90 parts of 1,3-butadiene, 10 parts of styrene, and a molecular weight controlling agent as shown in Table 2 below, followed by addition of 0.01 to 0.2 part of a commercially available divinylbenzene isomeric mixture (about 55% by weight divinylbenzene, about 40% by weight ethylvinyllbenzene, and about 5% by weight other materials) and a catalyst of 4.3 to 7.5 millimoles of allyl sodium. The 1,3-butadiene and styrene were copolymerized at 60° C. until the conversion reached at least 80% (for 1.5 to 2.5 hours). After the polymerization, the polymerization reaction mixture was poured into water to stop the polymerization. To 100 parts of the polymer were added 0.1 part of N-phenyl-β-naphthylamine and 37.5 parts of an aromatic extending oil (Comolex 300, a tradename for a highly aromatic oil for rubber extension produced by Nippon Oil Co., Ltd.). The solvent was separated by steam stripping, and the residue was dired at 70° C. to obtain an elastomeric polymer.

The yield, intrinsic viscosity, gel content, manner of combination of butadiene, butadiene trans-block, and Mooney viscosity of the resulting polymer were measured, and the results obtained are shown in Table 2 below.

TABLE 2

| | Sample No. | | | | |
|---|---|---|---|---|---|
| | 1 | 2 | 3 | 4 | 5 |
| Divinylbenzene (g)[1] | 0.2 | 0.1 | 0.05 | 0.01 | 0 |
| Trichlorobenzene (g) | 1.2 | 0.9 | 0.7 | 0.5 | 0.5 |
| Allyl Sodium (millimoles) | 7.5 | 6.0 | 5.5 | 4.3 | 4.5 |
| Polymerization Results: | | | | | |
| Polymer Yield (%) | 95 | 96 | 95 | 89 | 94 |
| Intrinsic Viscosity (dl/g)[2] | 2.9 | 2.9 | 3.0 | 3.0 | 2.8 |
| Gel Content (%)[3] | 0 | 0 | 0 | 0 | 0 |
| Amount of Trans-Bonding (%) | 61 | 60 | 62 | 61 | 60 |
| Mooney Viscosity (ML$_{1+4}$, 100° C.) | 59 | 57 | 60 | 55 | 45 |

Notes
[1] Grams per 100 g of monomer.
[2] Intrinsic viscosity measured as in Table 1.
[3] Amount of trans-bonding measured as in Table 1.

| | Parts |
|---|---|
| Stearic Acid | 2.0 |
| Antioxidant, BHT** | 1.0 |
| Aromatic Oil ("Sundex 731", manufactured by Sun Oil Co., Ltd.) | 7.5 |
| Sulfur | 2.0 |
| Accelerator***, CZ | 1.2 |

*High abrasion furnace carbon black
**2,6-Di-tert.-butyl p-cresol
***N-Cyclohexyl-2-benzothiazol-sulfenamide Each of the compounds obtained was vulcanized at 150° C. for 30 minutes. The roll processing characteristics of each polymer, the Mooney viscosity of each compound, and the properties of each vulcanizate were determined, and the results obtained are shown in Table 3 below.

Table 3

| | Sample No. | | | | | Commercially available Alfin Rubber AL-3712 (oil-extended) | Commercially available Alfin Rubber SBR-1712 (oil-extended) |
|---|---|---|---|---|---|---|---|
| | 1 | 2 | 3 | 4 | 5 | | |
| Roll Processing Characteristics: | | | | | | | |
| Mastication and "bagging" | Good | Good | Good | Good | Bagging occured | Hard | Good |
| Carbon Blendability | Good | Good | Good | Good | Good | Somewhat poor | Somewhat poor |
| Softness | Soft | Soft | Soft | Soft | Slightly hard | Hard | Soft |
| Finish | Good | Good | Good | Somewhat poor | Somewhat poor | Somewhat poor | Somewhat poor |
| Compound Properties: | | | | | | | |
| Viscosity (ML$_{1+4}$, 100° C.) | 52 | 56 | 60 | 63 | 71 | 56 | 56 |
| Mill Shrinkage (50° C.) (%) | 9 | 8 | 9 | 7 | 11 | 34 | 25 |
| Green Strength (50° C.) | | | | | | | |
| Tensile Strength (kg/cm$^2$) | 6 | 6 | 5 | 5 | 5 | 52 | 3 |
| Elongation (%) | 760 | 810 | 780 | 790 | 750 | 1170 | 600 |
| Vulcanizate Properties: | | | | | | | |
| Hardness (JIS) | 61 | 61 | 61 | 61 | 61 | 58 | 63 |
| 100% Tensile Stress (kg/cm$^2$) | 23 | 24 | 26 | 22 | 20 | 15 | 21 |
| 300% Tensile Stress (kg/cm$^2$) | 86 | 90 | 95 | 84 | 79 | 80 | 95 |
| Tensile Strength (kg/cm$^2$) | 211 | 207 | 210 | 208 | 195 | 205 | 220 |
| Elongation (%) | 651 | 646 | 638 | 655 | 642 | 640 | 600 |
| Permanent Compression Set (%) | 18 | 18 | 18 | 18 | 19 | 18 | 18 |
| Rebound (%) | 40 | 40 | 40 | 40 | 40 | 34 | 34 |
| Flex Cracking Growth | 31 | 31 | 31 | 31 | 29 | 32 | 27 |
| Goodrich Heat Build-up Test ΔT (° C.) | 25 | 25 | 25 | 25 | 25 | 25 | 25 |

The resulting rubbers were each compounded on rolls at 50° C. in accordance with the following compounding formulation.

| | Parts |
|---|---|
| Oil-extended Rubber | 137.5 |
| HAF Carbon Black* | 70.0 |
| Zinc Flower (=zinc oxide) | 3.0 |

EXAMPLE 8

A mixture of 90 parts of 1,3-butadiene and 10 parts of styrene was polymerized in the same manner as in Example 7 using 0.02 part of divinylbenzene as described in Example 7, 1.0 part of trichlorobenzene and 7.0 millimoles of allyl sodium. The resulting polymer was not oil-extended, but was dried after steam stripping.

The results of polymerization were as follows:

| | |
|---|---|
| Polymer Yield | 93% |
| Intrinsic Visocisity (dl/g) | 2.50 |
| Gel Content | 0% |
| Manner of Combination of Butadiene:- | |
| Trans | 60% |
| Vinyl | 40% |
| Cis | 0% |
| Mooney Viscosity ($ML_{1+4}$, 100° C.) | 51 |

The resulting polymer was compounded on rolls at 50° C. in accordance with the following compounding formulation.

| | Parts |
|---|---|
| Polymer | 100.0 |
| HAF Carbon Black | 50.0 |
| Zinc Oxide | 5.0 |
| Stearic Acid | 3.0 |
| Antioxidant, BHT | 1.0 |
| Aromatic Oil | 5.0 |
| Sulfur | 2.0 |
| Accelerator, CZ | 1.5 |

The resulting compound was vulcanized at 150° C. for 30 minutes. The roll processing characteristics of the compound and the properties of the vulcanizate were determined, and the results obtained are shown in Table 4 below in comparison with those of a commercially available Alfin Rubber (AL-3500, a product of Nippon Alfin Rubber Co., Ltd.) and SBR-1500 (a random copolymer of styrene and butadiene, produced by Japan Synthetic Rubber Co., Ltd.).

Table 4

| | Sample No. | | |
|---|---|---|---|
| | 6 (Example 8) | Commercially available Alfin Rubber AL-3500 | Commercially available Alfin Rubber SBR-1500 |
| Roll Processing Properties | | | |
| Mastication | Good | Hard | Good |
| Carbon Blendability | Good | Somewhat poor | Somewhat poor |
| Softness | Soft | Hard | Soft |
| Finish | Good | Somewhat poor | Somewhat poor |
| Compound Properties | | | |
| Mooney Viscosity ($ML_{1+4}$, 100° C.) | 60 | 65 | 65 |
| Mill Shrinkage (50° C.) | 18 | 27 | 33 |
| Green Strength (50° C.) | | | |
| Tensile Strength (kg/cm²) | 6 | 35 | 6 |
| Elongation (%) | 630 | 1200 | 550 |
| Vulcanizate Properties | | | |
| Hardness (JIS) | 70 | 68 | 73 |
| 100% Tensile Stress (kg/cm²) | 471 | 34 | 45 |
| 300% Tensile Stress (kg/cm²) | 163 | 140 | 160 |
| Tensile Strength (kg/cm²) | 231 | 209 | 250 |
| Elongation (%) | 503 | 460 | 460 |
| Permanent Compression Set (%) | 19 | 26 | 19 |
| Rebound (%) | 47 | 36 | 42 |
| Goodrich Heat Build-up Test, $\Delta T$ (° C.) | 29 | 35 | 31 |

EXAMPLE 9 and 10

The same procedure as in Example 7 was performed except that 100 parts of 1,3-butadiene (Example 9) or a mixture of 90 parts of 1,3-butadiene and 10 parts of isoprene (Example 10) was used as the monomer, and divinylbenzene as described in Example 7 and a molecular weight controlling agent were added in the amounts indicated in Table 5 below. To 100 parts of each of the polymers obtained was added 37.5 parts of Comolex 300 as an extending oil. The other polymerization conditions and the treating conditions after polymerization were the same as those set forth in Example 7.

The resulting polymers were each compounded in accordance with the compounding formulation set forth in Example 7.

The results of polymerization, the roll processing characteristics of the polymers and the Mooney viscosities of the compounds are shown in Table 5 below.

Table 5

| | Sample No. | |
|---|---|---|
| | 7 (Example 9) | 8 (Example 10) |
| Monomer: | | |
| 1,3-Butadiene (parts) | 100 | 90 |
| Isoprene (parts) | 0 | 10 |
| Divinylbenzene (parts) | 0.03 | 0.03 |
| Trichlorobenzene (parts) | 0.5 | 0.5 |
| Allyl Sodium (millilmoles) | 4.5 | 4.5 |
| Polymerization Results: | | |
| Conversion (%) | 93 | 92 |
| Intrinsic viscosity (dl/g) | 3.1 | 3.0 |
| Gel content (%) | 0 | 0 |
| Mooney viscosity (100° C.) ($ML_{1+4}$) | 51 | 49 |
| Roll Processing Characteristics: | | |
| Mastication | Good | Good |
| Carbon Blendability | Good | Good |
| Softness | Soft | Soft |
| Finish | Good | Good |
| Compound Mooney Viscosity ($ML_{1+4}$, 100° C.) | 56 | 51 |

EXAMPLE 11

An autoclave equipped with a stirrer, a thermometer, and external heating and cooling means was charged with 900 g of dry n-hexane, 90 g of butadiene, 10 g of styrene, and 0.5 g of trichlorobenzene as a molecular weight controlling agent under an atmosphere of nitrogen. Then, the catalyst was added, and the butadiene and styrene were copolymerized at 60° C. for 60 minutes. The final conversion was 95%. The polymerization reaction mixture was poured into water to stop the polymerization. Then, 0.1 g of N-phenyl-β-naphthylamine was added, and the mixture was dried under reduced pressure. The microstructure of the resulting polymer was examined using infrared spectroscopy, the molecular weight distribution curve of the resulting polymer was examined using gel-permeation chromatography, and the presence of absence of the trans-block of butadiene in the resulting polymer was examined. The results obtained are shown in Table 6 below. It was found that the resulting polymer had a moderately high molecular weight and a narrow distribution of molecular weight and was free from the trans-block of butadiene, and the yield of the polymer was high [Example 11-(a)]

The same procedure as above was carried out using a changed amount of trichlorobenzene. [Example 11-(b)]

The results obtained are shown in Table 6 below. It was found that the molecular weight distribution of the polymers was narrow, and no gel was formed.

EXAMPLE 13

The procedure of Example 11 was repeated except that 4.0 g of chlorobenzene was used as a molecular weight controlling agent instead of the trichlorobenzene. The results obtained are shown in Table 6 below. It was found that the polymer had a narrow molecular weight distribution, and no gel was formed.

EXAMPLE 14

The procedure of Example 11 was repeated except that 100 g of butadiene was used as the monomer. It was found that the polymer had a narrow molecular weight distribution, and no gel was formed.

EXAMPLE 15

The procedure of Example 11 was repeated except that 80 g of butadiene and 20 g of styrene were used as the monomer. The results obtained are shown in Table 6 below.

Table 6

| Example No. | Molecular Weight Controlling Agent | Amount of Molecular Weight Controlling Agent (g) | Amount of Feed Monomers Butadiene (g) | Amount of Feed Monomers Styrene (g) | Amount of Catalyst (millimoles of allyl sodium) | Polymerization Temperature (° C.) | Polymer Yield (%) | Polymerization Time (min.) | $[\eta]^{(1)}$ |
|---|---|---|---|---|---|---|---|---|---|
| Example 11-(a) | 1,2,4-Trichlorobenzene | 0.5 | 90 | 10 | 2.0 | 60 | 95 | 60 | 3.01 |
| Example 11-(b) | " | 1.0 | 90 | 10 | 2.1 | 60 | 94 | 60 | 2.11 |
| Example 12-(a) | o-Dichlorobenzene | 1.0 | 90 | 10 | 1.7 | 60 | 96 | 60 | 3.65 |
| Example 12-(b) | " | 2.5 | 90 | 10 | 2.3 | 60 | 97 | 60 | 2.46 |
| Example 13 | Chlorobenzene | 4.0 | 90 | 10 | 1.8 | 60 | 98 | 60 | 3.96 |
| Example 14 | 1,2,4-Trichlorobenzene | 0.5 | 100 | 0 | 1.9 | 60 | 97 | 60 | 3.32 |
| Example 15 | " | 0.5 | 80 | 20 | 2.1 | 60 | 94 | 60 | 3.06 |
| AL-3500[5] | — | — | — | — | — | — | — | — | 2.0 |
| JSR-1500[6] | — | — | — | — | — | — | — | — | 2.1 |

| Example No. | Microstructure of Polymer[2] 1,4-Cis | 1,4-Trans | 1,2-Vinyl | Styrene | Molecular Weight Distribution[3] (Mw/Mn) | Trans-block[4] |
|---|---|---|---|---|---|---|
| Example 11-(a) | 0 | 64 | 36 | 9.9 | 3.7 | Absent |
| Example 11-(b) | 0 | 64 | 36 | 9.8 | 3.8 | Absent |
| Example 12-(a) | 0 | 64 | 36 | 9.8 | 4.1 | Absent |
| Example 12-(b) | 0 | 64 | 36 | 9.8 | 4.3 | Absent |
| Example 13 | 0 | 65 | 35 | 9.9 | 5.1 | Absent |
| Example 14 | 0 | 64 | 36 | 9.8 | 3.6 | Absent |
| Example 15 | 0 | 64 | 36 | 9.8 | 3.7 | Absent |
| AL-3500[5] | 0 | 65 | 35 | 14.5 | 8.7 | Present |
| JSR-1500[6] | 13 | 69 | 18 | 23.2 | 4.2 | Absent |

Notes
[1]Intrinsic viscosity measured as in Table 1.
[2]Microstructure measured as in Table 1.
[3]Molecular weight distribution determined as described in Table 1.
[4]Trans-block presence or absence determined as described in Table 1.
[5]For comparison, a commercially available product, Alfin Rubber AL-3500, a product of Nippon Alfin Rubber Co., Ltd. was used.
[6]For comparison, a commercially available product, JSR-1500 (a random copolymer of styrene and butadiene, produced by Japan Rubber Co., Ltd.) was used.

EXAMPLE 12

The procedure of Example 11 was repeated except that 1.0 g of o-dichlorobenzene was used as a molecular weight controlling agent instead of the trichlorobenzene. [Example 12-(a)]

The same procedure was carried out using a changed amount of o-dichlorobenzene. [Example 12-(b)]

EXAMPLE 16

The roll banding of the polymers obtained in Example 11-(a), and Example 12-(a) was examined. The results obtained are shown below.

| | Roll Banding [1] | Flexibility |
|---|---|---|
| Polymer of Example 11-(a) | Smoothly banded | Flexible |
| Polymer of Example 12-(a) | Smoothly banded | Flexible |
| Polymer Obtained with an Alkyl Lithium Catalyst [2] | Not banded at all | Flexible |
| Polymer Obtained with an Alfin Catalyst [3] | Partly banded, but quite unstable | Hard |

While the invention has been described in detail and with reference to specific embodiments thereof, it will be apparent to one skilled in the art that various changes and modifications can be made therein without departing from the spirit and scope thereof.

What is claimed is:

1. A process for producing a conjugated diene polymer, which comprises polymerizing (a) a conjugated diene, (b) two or more conjugated dienes or (c) at least one conjugated diene with a monovinyl aromatic compound, at a temperature of from about 40° to about 100° C. in an inert hydrocarbon solvent in the presence of trichlorobenzene and a catalyst composition comprising (i) an alkenyl sodium containing 3 to 8 carbon atoms in the alkenyl moiety and (ii) a sodium tertiary alkoxide of a dimethylalkyl carbinol containing 1 to 5 carbon atoms in the alkyl moiety.

2. The process of claim 2, wherein the polymerization is carried out in the further presence of about 0.01 to about 0.5 part by weight of a polyvinyl aromatic compound, per 100 parts by weight of the total weight of conjugated diene and monovinyl aromatic compound.

3. The process of claim 1, wherein the amount of the catalyst ranges from about 0.1 to about 200 mmoles of alkenyl sodium per 100 g of the total weight of conjugated diene and monovinyl aromatic compound.

4. The process of claim 1, wherein the molar ratio of said sodium alkoxide (ii) to the alkenyl sodium (i) ranges from about 0.2:1 to about 4:1.

5. The process of claim 1, wherein the amount of said monovinyl aromatic compound ranges up to about 80% by weight of the total weight of conjugated diene and monovinyl aromatic compound.

6. The process of claim 1, wherein said conjugated diene is selected from the group consisting of 1,3-butadiene, isoprene, piperylene and 2,3-dimethyl butadiene.

7. The process of claim 1, wherein said monovinyl aromatic compound is selected from the group consisting of styrene, divinylbenzene, α-methylstyrene, β-methylstyrene, 3-vinyltoluene, 1-vinylnaphthalene, 2-vinylnaphthalene, p-methoxystyrene and p-chlorostyrene.

8. The process of claim 1, wherein said inert hydrocarbon solvent is selected from the group consisting of aliphatic saturated hydrocarbons, alicyclic hydrocarbons and aromatic hydrocarbons.

9. The process of claim 8, wherein said aliphatic saturated hydrocarbons are selected from the group consisting of n-hexane, n-pentane and iso-octane; said alicyclic hydrocarbons are selected from the group consisting of cyclohexane and methylcyclohexane; and said aromatic hydrocarbons are selected from the group consisting of benzene, toluene, xylene and tetralin.

10. The process of claim 1, wherein said dimethylalkyl carbinol is selected from the group consisting of tert.-butyl alcohol, tert.-pentyl alcohol, 2-methyl-2-pentanol and 2,3-dimethyl-2-butanol.

11. The process of claim 2, wherein said polyvinyl aromatic compound is represented by the formula

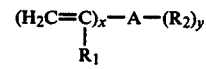

wherein A represents an unsubstituted or substituted aromatic ring, $R_1$ and $R_2$ each represents a hydrogen atom or an unsubstituted or substituted aliphatic group containing 1 to 20 carbon atoms, x represents an integer of at least 2 and up to the maximum number (n) of

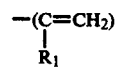

groups that can be substituted on the aromatic ring A, and y is an integer of from 0 to (n-2) and represents the number of the substituents $R_2$.

12. The process of claim 11, wherein said polyvinyl aromatic compound is selected from the group consisting of divinylbenzene, trivinylbenzene, tetravinylbenzene, divinyltoluene, trivinyltoluene, divinylxylene, trivinylxylene, tetravinylxylene, divinylnapthalene, trivinylnaphthalene, divinylbiphenyl, trivinylbiphenyl and mixtures thereof.

13. The process of claim 1, where said halogenated aromatic hydrocarbon is present in an amount ranging from about 0.01 to about 10 g per 100 g of the total weight of conjugated diene and monovinyl aromatic compound.

14. The process of claim 1, wherein said polymerization is carried out in a batchwise manner, a semi-continuous manner or a continuous manner.

15. The process of claim 1, wherein said catalyst consists essentially of (i) said alkenyl sodium and (ii) said sodium alkoxide.